(12) United States Patent
Li et al.

(10) Patent No.: US 11,694,097 B2
(45) Date of Patent: Jul. 4, 2023

(54) REGRESSION MODELING OF SPARSE ACYCLIC GRAPHS IN TIME SERIES CAUSAL INFERENCE

(71) Applicant: Alibaba Group Holding Limited, Grand Cayman (KY)

(72) Inventors: Yan Li, Bellevue, WA (US); Jingkun Gao, Bellevue, WA (US); Xiaomin Song, Bellevue, WA (US); Liang Sun, Bellevue, WA (US); Tao Yao, Bellevue, WA (US)

(73) Assignee: Alibaba Group Holding Limited

( * ) Notice: Subject to any disclaimer, the term of this patent is extended or adjusted under 35 U.S.C. 154(b) by 547 days.

(21) Appl. No.: 16/804,242

(22) Filed: Feb. 28, 2020

(65) Prior Publication Data

US 2021/0271984 A1    Sep. 2, 2021

(51) Int. Cl.
| | |
|---|---|
| *G06F 16/00* | (2019.01) |
| *G06N 5/04* | (2023.01) |
| *G06N 3/02* | (2006.01) |
| *G06F 17/16* | (2006.01) |

(52) U.S. Cl.
CPC .............. *G06N 5/04* (2013.01); *G06F 17/16* (2013.01); *G06N 3/02* (2013.01)

(58) Field of Classification Search
CPC ............. G06F 17/16; G06N 5/04; G06N 3/02
USPC .......................................................... 706/52
See application file for complete search history.

(56) References Cited

U.S. PATENT DOCUMENTS

| | | | | |
|---|---|---|---|---|
| 2019/0312898 A1* | 10/2019 | Verma | .................... | G06N 5/022 707/707 |
| 2020/0042857 A1* | 2/2020 | Fang | .................. | G06F 16/9024 707/707 |
| 2021/0134418 A1* | 5/2021 | Frieder | .................. | G06N 3/045 707/707 |

FOREIGN PATENT DOCUMENTS

WO    WO2014055293    *    4/2014    ............. A61B 5/055

* cited by examiner

*Primary Examiner* — Alexandria Y Bromell
(74) *Attorney, Agent, or Firm* — Lee & Hayes, P.C.

(57) ABSTRACT

By the abovementioned technical solutions, the present disclosure provides optimizing a vector autoregressive model conforming to structural constraints of sparsity and acyclicity. A regularization term is introduced to the model to impose the sparsity structural constraint such that most off-diagonal coefficients of an autoregressive coefficient matrix are forced to zero values. One or more penalty terms are introduced to the model to impose the acyclicity structural constraint such that coefficients of the main diagonal are not causally self-related. The resulting model is then reformulated for computation as an augmented Lagrangian function, and further computed for different parameters in alternating iterations to make the computations tractable and within magnitude and precision limits of digital computers. Models of the present disclosure provide improved computing performance over existing models by directly inferring a sparse causal network having a directed acyclic graph structure without a separate pruning step.

17 Claims, 6 Drawing Sheets

200

```
┌─────────────────────────────────────────────────────────────┐
│ RECEIVE AS INPUT MULTIVARIATE TIME SERIES OR MULTIPLE        │
│ UNIVARIATE TIME SERIES; FIRST PENALTY PARAMETER; AND         │
│ REGULARIZATION PARAMETER                                     │
│ 202                                                          │
└─────────────────────────────────────────────────────────────┘
                              ↓
┌─────────────────────────────────────────────────────────────┐
│ INITIALIZE, FOR GRADIENT ITERATION COUNTER STARTING AT 1,   │
│ TENSOR AS ZERO TENSOR; ADJACENCY MATRIX AS ZERO MATRIX;      │
│ FIRST SCALED DUAL VARIABLE AS ZERO MATRIX; SECOND SCALED     │
│ DUAL VARIABLE AS ZERO VALUE                                  │
│ 204                                                          │
└─────────────────────────────────────────────────────────────┘
                              ↓
┌─────────────────────────────────────────────────────────────┐
│ COMPUTE TENSOR BY SOLVING FIRST OPTIMIZATION FUNCTION BY     │
│ GRADIENT ALGORITHM                                           │
│ 206                                                          │
└─────────────────────────────────────────────────────────────┘
                              ↓
┌─────────────────────────────────────────────────────────────┐
│ INITIALIZE, FOR QUASI-NEWTON ITERATION COUNTER STARTING AT 1,│
│ SECOND PENALTY PARAMETER AT INITIAL VALUE AND COPY OF        │
│ ADJACENCY MATRIX                                             │
│ 208                                                          │
└─────────────────────────────────────────────────────────────┘
                              ↓
┌─────────────────────────────────────────────────────────────┐
│ COMPUTE COPY OF ADJACENCY MATRIX BY SOLVING SECOND           │
│ OPTIMIZATION FUNCTION BY QUASI-NEWTON ALGORITHM              │
│ 210                                                          │
└─────────────────────────────────────────────────────────────┘
    UPPER BOUND /             ↓
    MAX NOT REACHED,
    LOOP NOT TERMINATED
┌─────────────────────────────────────────────────────────────┐
│ INCREASE SECOND PENALTY PARAMETER FOR NEXT QUASI-NEWTON      │
│ ITERATION WHILE ACYCLICITY CONSTRAINT MAINTAINED             │
│ 212                                                          │
└─────────────────────────────────────────────────────────────┘
        UPPER BOUND / MAXIMUM ↓ REACHED OR LOOP TERMINATED
┌─────────────────────────────────────────────────────────────┐
│ UPDATE ADJACENCY MATRIX FOR NEXT GRADIENT ITERATION USING    │
│ COMPUTED COPY OF ADJACENCY MATRIX                            │
│ 214                                                          │
└─────────────────────────────────────────────────────────────┘
                              ↓
┌─────────────────────────────────────────────────────────────┐
│ UPDATE FIRST SCALED DUAL VARIABLE, SECOND SCALED DUAL        │
│ VARIABLE, AND GRADIENT ITERATION COUNTER                     │
│ 216                                                          │
└─────────────────────────────────────────────────────────────┘
   No CONVERGENCE             ↓ CONVERGENCE
┌─────────────────────────────────────────────────────────────┐
│ OUTPUT TENSOR AND ADJACENCY MATRIX REPRESENTING INFERRED     │
│ CAUSAL NETWORK UPON CONVERGENCE                              │
│ 218                                                          │
└─────────────────────────────────────────────────────────────┘
```

FIG. 2

REGRESSION MODELING OF SPARSE ACYCLIC GRAPHS IN TIME SERIES CAUSAL INFERENCE

BACKGROUND

Causal inference is a broad field of study to determine whether one event causes another, which may further result in actionable predictions of future events. For example, values of goods, property, and assets on the market may change over time due to events such as changes of seasons, changes of weather, changes of public policy, and the like. By determining that changes of some variables cause changes of other variables, actionable predictions may be made to, for example, set prices efficiently based on anticipated market price changes.

Events which serve as a basis for causal inference may be represented in various forms, including as a time series. A time series is generally a collection of data points collected at periodic time points. A multivariate time series may include multiple time series each corresponding to a different variable. For example, as mentioned above, market price, seasons, weather, policy, and the like may each be represented by a variable.

Causal inference performed over multivariate time series may be based on the concept of Granger causality. Granger causality is predicated on the definition that variable $x_i$ Granger-causes variable $x_j$ if discarding variable $x_i$ from a time series causes a reduced variance of residuals for $x_j$ in a fitting to a regression model. A variety of regression models may be used for fitting the time series data in Granger causality inference, including vector autoregressive ("VAR") models.

Application of Granger causality inference to multivariate time series has led to the concept of network Granger causality, wherein, in addition to fitting the time series data to a regression model, a Bayesian network topology between the multivariate variables is further specified. A Bayesian network is generally a graph structure which illustrates causal relationships between variables, such as, for example, market price, seasons, weather, and policy as given in the above example. However, while simple causal relationships between few variables may be manually defined by human researchers based on intuition, in multivariate time series causality graphs are generally too complex to be determined by intuition or by inspection of data, due to there being many variables where causal relationships therebetween may change over time.

Thus, there is a need to implement regression models to determine Bayesian network topologies between variables of multivariate time series, which remains an open-ended problem with no settled solution in the art.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates a method of optimizing a sparse vector autoregressive model operating under directed acyclic graph structural constraints according to example embodiments of the present disclosure.

DETAILED DESCRIPTION

Figure 1:
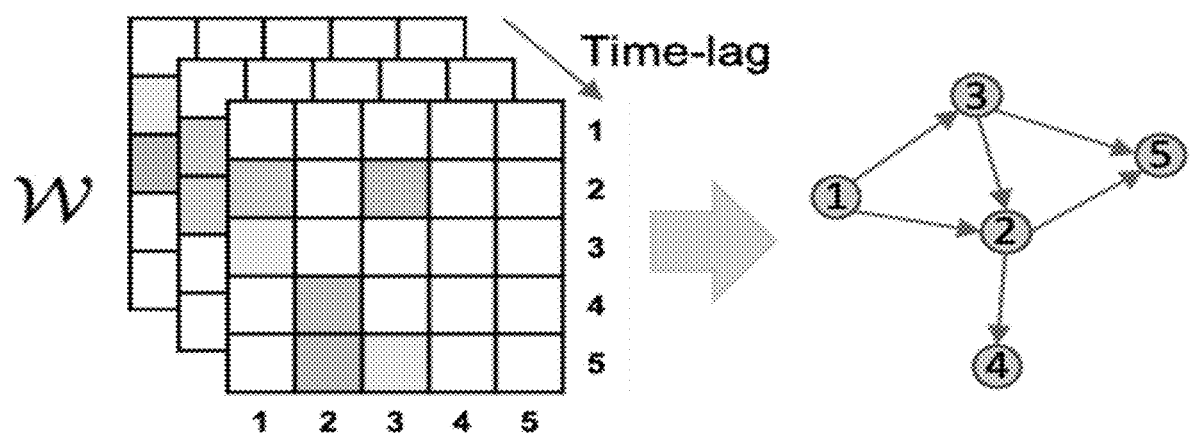
FIG. 1 illustrates a correspondence between an inferred causal network and its adjacency matrix.

Systems and methods discussed herein are directed to implementing a vector autoregression model, and more specifically implementing a sparse vector autoregression model which accounts for directed acyclic graph topology in a Bayesian network.

A regression model, according to example embodiments of the present disclosure, may be a set of equations fitted to observations of values of variables. A regression model may be computed based on observed data, and computation of the model may include inference of causal relationships between variables of the observed data. A computed regression model may be utilized to forecast or predict future values of variables which are part of the regression model.

A regression model may be, for example, an autoregressive ("AR") model, wherein variables are modeled as being dependent their own past values during previously observed time periods. Past periods of a time series may be referenced as "lag" numbered by distance from a current period; for example, for a variable $x_t$ observed at time t, an observation $x_{t-1}$ made at time t−1 may be referenced as a first lag of x; an observation $x_{t-2}$ made at time t−2 may be referenced as a second lag of x; and so on. Thus, an AR model may model a value of a variable at time t as depending on values of the variable at time t−1, t−2, and the like.

An AR model may further be, for example, a vector autoregressive ("VAR") model, wherein variables are modeled as being dependent on their own and or other variables' past values in the multivariate time series. Thus, a VAR model may model a value of a variable at time t as depending on values of any number of variables of the multivariate time series at time t−1, t−2, and the like Such equations may further be represented in vector form, wherein a vector containing values of variables at time t may be written as a product of a vector containing values of the first lag of the variables with an autoregressive coefficient matrix, the coefficients representing the inferred causality between the variables of the multivariate time series, plus a vector containing error terms. For example, by way of example, a linear VAR model may be written in the form of a linear equation as follows:

$$\begin{bmatrix} x_{1t} \\ x_{2t} \end{bmatrix} = \begin{bmatrix} w_{11} & w_{12} \\ w_{21} & w_{22} \end{bmatrix} \begin{bmatrix} x_{1t-1} \\ x_{2t-1} \end{bmatrix} + \begin{bmatrix} n_{1t} \\ n_{2t} \end{bmatrix}$$

Wherein $x_{1t}$, and $x_{2t}$ are observed values of two different variables of a multivariate time series at time t, and, correspondingly, $x_{1t-1}$ and $x_{2t-1}$ are observed values of the first lag of the same two variables; $w_{ij}$ are coefficients of an autoregressive coefficient matrix; and $n_{1t}$ and $n_{2t}$ are random noise.

Since the coefficients of the autoregressive coefficient matrix represent inferred causal relationships between the variables of the multivariate time series (i.e., a non-zero coefficient $w_{ij}$ represents an inferred causal relationship between variables $x_i$ and $x_j$ over at least the first lag, and a coefficient $w_{ij}$ which is zero represents an inferred absence of a causal relationship between variables $x_i$ and $x_j$), the autoregressive coefficient matrix may be an adjacency matrix of a graph which also represents the inferred causal relationships. In such a graph, vertices of the graph may represent the variables of the multivariate time series, a (directional) edge between two vertices over at least a first lag may represent an inferred causal relationship between the variables represented by the two vertices (in the direction of the edge), and the absence of an edge between two vertices may represent an inferred absence of a causal relationship between the variables represented by the two vertices (in either direction).

A Bayesian network may be utilized as a structural constraint in causal inference models. For example, a Bayesian network may impose the structural constraint that an inferred causality model should be a directed acyclic graph ("DAG"), wherein no sequence of edges starting from any particular vertex will lead back to the same vertex. Persons skilled in the art will generally appreciate that acyclicity of DAG is a conventionally accepted structural constraint on causal inference models for the purpose of facilitating computations of Bayesian statistical distributions; further details thereof need not be elaborated upon herein for understanding of example embodiments of the present disclosure.

However, causal inference modeling computations as known to persons skilled in the art do not conform to the constraints of a DAG structure, including acyclicity, in fitting models. Consequently, causal inference modeling computations as known to persons skilled in the art further implement a second step of pruning performed upon graphs and adjacency matrixes of the causal inference model. Based on heuristics, edges may be deleted and coefficients may be replaced with zero values to cause a graph and its adjacency matrix to conform to DAG structural constraints. A shortcoming of such a two-step approach is that the pruning step is performed independently from the fitting step, and thus cannot be performed based on the context of the fitting step. Thus, pruned edges and coefficients may be arbitrary, and causal relationships which are, in reality, cogent to explaining the observed data may be discarded in a DAG model produced by pruning.

Furthermore, according to example embodiments of the present disclosure, it is expected that, in accordance with behaviors of observed causal networks in reality, causal relationships between variables will usually be sparse: that is, each variable in a multivariate time series is expected to have causal relationships with relatively few of the other variables. Thus, the graph of the causal inference model is expected to be sparse in terms of each vertex being connected to relatively few other vertices by edges, and the adjacency matrix of the graph is also expected to be sparse in terms of most coefficients thereof having zero values.

Causal inference modeling computations as known to persons skilled in the art also do not conform to expectations of network sparsity in fitting models. Colloquially, it is said that correlation does not imply causation. However, generally, causal inference modeling exhibits overfitting, wherein inferences of causation are modeled with regard to a majority of variables, rather than a minority of variables as expected. Causal inference models thus tend to be dense, resulting in pruning by heuristics as described above being utilized to conform to not just DAG structural constraints but also sparsity expectations. The limitations of the independently performed pruning step as described above apply here in a similar manner, and pruning to conform to both structural constraints and sparsity may further exacerbate these shortcomings of the independently performed pruning step.

Example embodiments of the present disclosure provide a causal inference model wherein fitting of the model to observed data, which may be either a multivariate time series or multiple univariate time series, is performed based on a DAG structural constraint and based on structural sparsity. Thus, fitted models by causal inference computation techniques as described herein may conform to a DAG structural constraint (for example, the model may have the structure of an acyclic graph) without application of a subsequent pruning step. Fitted models by causal inference computation techniques as described herein may also be substantially sparse, rather than dense, as described above in terms of both a graph structure and its adjacency matrix. A causal inference model according to example embodiments of the present disclosure may therefore be referred to as a sparse VAR model operating under DAG constraints ("sVAR-DAG"). It should be noted that the abbreviation "SVAR" may be known to persons skilled in the art as having other significance with reference to VAR models; however, the abbreviation "SVAR" is not discussed herein and should therefore be distinguished from the abbreviation "sVAR" as the present disclosure provides, to facilitate in understanding example embodiments of the present disclosure.

Example embodiments of the present disclosure are illustrated by the following generalization of a linear VAR model (which encompasses the above example linear model):

$$x[t] = \sum_{l=1}^{L} W^{(l)} x[t-l] + n[t]$$

The vector x[t] includes observed values of each variable $\{x_i, \forall i=1, 2, \ldots N\}$ of a multivariate time series of N variables or multiple univariate time series of N variables. The linear VAR model need not limit causal relationships to observed values of a first lag at time t−1 but may also infer causal relationships to observed values of a second lag at time t−2, third lag at time t−3, fourth lag at time t−4, . . . , and up to L lags. For observed values x[t−l] at time t−l for each l-th lag, an autoregressive coefficient matrix $W^{(l)}$ for the l-th lag may be derived to fit inferred causal relationships between x[t−l] and x[t]. Each $W^{(l)}$ may be, furthermore, a non-negative weighted adjacency matrix of a DAG which represents an inferred causal network between each variable $x_1, x_2, \ldots, x_N$ of the l-th lag.

Given a multivariate time series or multiple univariate time series, in either case including T observations of data of the multiple variables, and expressed as $X \in \mathbb{R}^{N \times T}$, the linear VAR model should infer a latent N-node DAG $\mathcal{G}(\mathcal{V}, \varepsilon, A)$, wherein $\mathcal{V}, = \{1, 2, \ldots, N\}$ includes N vertices each corresponding to one variable of X, and $\varepsilon \subseteq \mathcal{V} \times \mathcal{V}$, includes potentially up to $\mathcal{V}, \times \mathcal{V}$, edges between each vertex i and vertex j.

FIG. 1 illustrates a correspondence between an inferred causal network and its adjacency matrix. Both the inferred causal network and its adjacency matrix illustrate the same inferred causal relationships between the variables $x_1, x_2, x_3$, $x_4$, and $x_5$. The illustrated inferred causal network conforms to DAG structural constraints: it is a directed graph wherein no sequence of edges starting from any particular vertex will lead back to the same vertex. The illustrated inferred causal network also conforms to structural sparsity: each vertex is connected to no more than two of the other vertices, and is not connected to the rest. The structural sparsity of the causal network may also be observed in the corresponding adjacency matrix as illustrated: most of the coefficients of the adjacency matrix are unshaded, indicating zero values, and only a minority are shaded, indicating non-zero values.

According to example embodiments of the present disclosure, $W^{(l)} \in \mathbb{R}^{N \times N}$, and each coefficient $w_{ij}^{(l)}$ of $W^{(l)}$, if nonzero, may represent an inferred causal relationship between $x_i$ and $x_j$ at the l-th lag (represented in the graph as $j \rightarrow i \in \varepsilon$, $j \rightarrow i$ indicating $x_i$ being influenced by $x_j$); and, if zero, may represent no inferred causal relationship between $x_i$ and $x_j$ at the l-th lag (represented in the graph as $j \rightarrow i \notin \varepsilon$, the absence of $j \rightarrow i$ indicating $x_i$ not being influenced by $x_j$) Example embodiments of the present disclosure provide an inferred causality model having constraints thereupon which tend to cause the model to be fitted having a structure having characteristics as illustrated by FIG. 1: the coefficients $w_{ij}^{(l)}$ should tend to be sparse and correspond to a graph having DAG structural constraints. Example embodiments of the present disclosure provide a group Lasso regularization term to enforce structural sparsity on an inferred causality model. Example embodiments of the present disclosure also provide an acyclicity constraint on the inferred causality model by defining an adjacency matrix A having acyclicity constraints built in.

According to example embodiments of the present disclosure, structural sparsity may tend to be enforced upon off-diagonal coefficients of an autoregressive coefficient matrix, and acyclicity may tend to be enforced upon coefficients on the main diagonal of an autoregressive coefficient matrix.

Fitting the general linear VAR model given above may be computed by solving the following optimization function:

$$\mathop{\mathrm{argmin}}_{w} \frac{1}{2} \sum_{t=L+1}^{T} \left\| x[t] - \sum_{l=1}^{L} W^{(l)} x[t-l] \right\|_2^2$$

Wherein $\mathcal{W} = [W^{(1)}, W^{(2)}, \ldots, W^{(L)}] \in \mathbb{R}^{N \times N \times L}$ may be a three-dimensional tensor of each autoregressive coefficient matrix over L lags. However, the above linear VAR model tends to produce a fitted model exhibiting a dense $\mathcal{W}$ instead of a sparse $\mathcal{W}$. Thus, according to example embodiments of the present disclosure, the above linear VAR model may be modified to impose structural sparsity.

For example, $W^{(l)}$ may be stipulated as having a same sparse pattern for each l. That is, irrespective of the magnitudes of nonzero coefficients, coefficients having zero values in one $W^{(l)}$ may similarly have zero values in each other $W^{(l)}$. In other words, to enforce structural sparsity, if it is inferred that there is no causal relationship between variables $x_i$ and $x_j$, there should be no causal relationship between variables $x_i$ and $x_j$ across each l in L. This is logically stated by the following contrapositive statements:

$w_{ij}^{(l)} \neq 0, \exists l \in \{1, 2, \ldots, L\} \Rightarrow j \rightarrow i \in \varepsilon$ $j \rightarrow i \notin \varepsilon \Rightarrow w_{ij}^{(l)} = 0, \forall l \in \{1, 2, \ldots, L\}$ ("There exists a l-th lag over which $x_i$ and $x_j$ have a causal relationship if and only if an edge connects vertices i and j; no edge connects vertices i and j if and only if $x_i$ and $x_j$ have no causal relationship for each lag l in L.")

To modify the linear VAR model to enforce this stipulation, a regularization term based on group Lasso variable selection may be added to the linear VAR model. A regularization term may refer to a term tending to have a variable selection effect wherein off-diagonal coefficients of the autoregressive coefficient matrix tend to be pushed towards zero values, depending on the magnitude of a regularization parameter $\lambda$. The regularization term may be written as:

$$\lambda \sum_{i,j: i \neq j} \|w_{ij}\|_2$$

Where $\lambda \geq 0$.

According to example embodiments of the present disclosure, though the linear VAR model may be computed iteratively to arrive at a fitted model, it is desired to initialize $\lambda$ to a sufficiently large value during the first iteration of computing the linear VAR model to force all off-diagonal coefficients to zero values, so that the fitted model will start at a state which is close to convergence: $\{(w_{ij})_{<0>} \equiv 0 | \forall i, j = 1, 2, \ldots, N \,\&\, i \neq j\}$. In each p-th training phase with $\lambda_{(p)}$, letting $\mathcal{W}_{<p>}^0 \doteq \widehat{\mathcal{W}}_{<p->}$ (that is, the initial value of the p-th tensor $\mathcal{W}$ is set to be the optimal one learned from the previous training phase) facilitates convergence of the model to an optimal fitted model.

Furthermore, $\lambda$ is then gradually decreased in each iteration of the linear VAR model fitting by steps which shall be subsequently described.

Moreover, the above linear VAR model may produce a fitted model exhibiting cyclicity. Thus, according to example embodiments of the present disclosure, the above linear VAR model may be modified to impose acyclicity.

While a cyclical structure of a fitted model may not be discernable by inspecting coefficients of an adjacency matrix, multiplying the adjacency matrix by itself may reveal cyclical structures: for the m-th power of the adjacency matrix, a coefficient $w_{ij}$ becoming zero in value indicates that there is no path of length m connecting vertices i and j, and a coefficient $w_{ij}$ being nonzero in value indicates that there is a path of at least length m connecting vertices i and j. Thus, given a non-negative adjacency matrix A, $A \in \mathbb{R}^{N \times N}$, $(A^m)_{ij} > 0$ indicates the existence of a length-m path between notes i and j.

To determine acyclicity, coefficients on the main diagonal of an adjacency matrix are of particular interest. In a cyclic graph, a path exists that would ultimately connect a vertex i back to itself. By the above test, this may be written as $(A^m)_{ii} > 0$. Thus, for a graph to be determined as acyclic, $(A^m)_{ii} = 0$ must be true for all vertices i for $\forall i = 1, 2, \ldots N$, and for all natural numbers m. $(A^m)_{ii}$ cannot be computed for all natural numbers m, since the computation would run infinitely.

Instead, according to example embodiments of the present disclosure, the following statement may be equivalent to the statement that $(A^m)_{ii} = 0$ is true for all i ($\forall i = 1, 2, \ldots N$) and all natural numbers m:

$\mathrm{trace}(e^A) = N$

Wherein the trace( ) function refers to the sum of all coefficients of a matrix's main diagonal, and $e^A$ (i.e., the exponential of the matrix A) is an N×N matrix defined as:

$$e^A = \sum_{k=0}^{\infty} \frac{1}{k!} A^k$$

Computing the exponential of a matrix remains an open-ended problem in the art, and while various computational methods are known, no known method can achieve perfect accuracy for all possible matrices, since digital computers must inherently rely on discrete approximations of real numbers to perform computations. Moreover, as magnitude of the coefficients arbitrarily increases or arbitrarily decreases, both very large and very small coefficients may cause computations to overrun magnitude and precision limits inherent to digital computers. No one method should be considered comprehensive for such computations, and the present disclosure shall not be limited to any particular computation method thereof. For the purpose of understanding example embodiments of the present disclosure, it shall suffice to say that a scaling parameter may be applied to coefficients of the matrix to decrease the magnitude of very large coefficients, and increase the magnitude of very small coefficients, to cause computation results to be within magnitude and precision limits of digital computers, which include example embodiments computing systems implementing example embodiments of the present disclosure (as shall be described by way of example subsequently in further detail).

Proof of the equivalence of the above statements may be derived, but need not be described in detail herein for the purpose of understanding example embodiments of the present disclosure.

Based on deriving A, to enforce acyclicity over the tensor W, the following constraint may be added to the linear VAR model:

$$a_{ij} = \begin{cases} \beta \|w_{ij}\|_2^2 & \text{if } i \neq j, \\ 0 & \text{if } i = j \end{cases}$$

Wherein $w_{ij} = [w_{ij}^{(1)}, w_{ij}^{(2)}, \ldots, w_{ij}^{(L)}] \in \mathbb{R}^{1 \times L}$ is a vector containing the influence of vertex j on vertex i at each l-th lag. $\beta$, where $\beta > 0$, is a scaling factor as described above to control accuracy and computation time of computing the exponential of the matrix A. These considerations apply regardless of actual computing power of a computing system implementing example embodiments of the present disclosure, as the magnitude precision limits entailed are fundamental to digital computer technology.

To set $\beta_{<p>}$ for each p-th training phase 1, 2, . . . , it may be set as the reciprocal of the mean value of all nonzero elements in $\{\|(\hat{w}_{ij})_{<p-1>}\|_2^2, i \neq j\}$, as follows:

$$\beta_{(p)} \doteq \frac{\sum_{i,j:\, i \neq j} \mathcal{I}(\|(\hat{w}_{ij})_{(p-1)}\|_2^2 \neq 0)}{\sum_{i,j:\, i \neq j} \|(\hat{w}_{ij})_{(p-1)}\|_2^2}$$

The above is used if $\sum_{i,j:\, i \neq j} \mathcal{I}(\|(\hat{w}_{ij})_{<p-1>}\|_2^2 \neq 0) > 0$. If not, $\beta_{<p>} \doteq 1$.

Overall, the linear VAR model, modified to impose structural sparsity, and further modified to impose acyclicity, has the following optimization function:

$$\operatorname*{argmin}_W \frac{1}{2} \sum_{t=L+1}^{T} \left\| x[t] - \sum_{l=1}^{L} W^{(l)} x[t-l] \right\|_2^2 + \lambda \sum_{i,j:\, i \neq j} \|w_{ij}\|_2$$

$$a_{ij} = \begin{cases} \beta \|w_{ij}\|_2^2 & \text{if } i \neq j, \\ 0 & \text{if } i = j \end{cases}$$

$$\operatorname{trace}(e^A) = N$$

It should be understood that the constraints of this optimization function render it unsolvable by suitable optimization algorithms such as proximal gradient, as known to persons skilled in the art. Thus, according to example embodiments of the present disclosure, the optimization function may be solved by an augmented Lagrangian method, wherein each of the constraints is rewritten as a penalty parameter of the optimization function, resulting in an augmented Lagrangian function. Moreover, the augmented Lagrangian function may be solved by an alternating direction method of multipliers ("ADMM") method, wherein the augmented Lagrangian function is, in alternating iterations, solved for minimizing one parameter while holding the other parameters.

According to example embodiments of the present disclosure, the augmented Lagrangian function may have the form $\mathcal{L}(\mathcal{W}, A, V, b)$ as written below, formulated using the additional scaled dual variables $V \in \mathbb{R}^{N \times N}$ and b. The augmented Lagrangian function may be alternatingly solved for $\mathcal{W}$ while holding each other parameter constant (then updating each variable), and solved for A while holding each other parameter constant (then updating each variable):

$$\mathcal{L}(W, A, V, b)$$
$$= \frac{1}{2} \sum_{t=L+1}^{T} \left\| x[t] - \sum_{l=1}^{L} W^{(l)} x[t-l] \right\|_2^2 + \lambda \sum_{i,j:\, i \neq j} \|w_{ij}\|_2$$
$$+ \frac{\rho_1}{2} \sum_{i,j:\, i \neq j} (a_{ij} - \beta \|w_{ij}\|_2^2 + v_{ij})^2$$
$$+ \frac{\rho_2}{2} (\operatorname{trace}(e^A) - N + b)^2$$

Herein, $\rho_1$ and $\rho_2$ are the penalty parameters rewriting the two constraints of the linear VAR model.

Each iteration k+1 solving for $\mathcal{W}^{k+1}$ may solve the following optimization function holding the parameters $A^k$, $V^k$, and $b^k$ from the previous iteration constant:

$$W^{k+1} \leftarrow \operatorname*{argmin}_W f_1(W) + f_2(W) + \lambda \sum_{i,j:\, i \neq j} \|w_{ij}\|_2$$

$$f_1(W) \doteq \frac{1}{2} \sum_{t=L+1}^{T} \left\| x[t] - \sum_{l=1}^{L} W^{(l)} x[t-l] \right\|_2^2$$

$$f_2(W) \doteq \frac{\rho_1}{2} \sum_{i,j:\, i \neq j} (a_{ij}^k - \beta \|w_{ij}\|_2^2 + v_{ij}^k)^2$$

This optimization function may be solved by a proximal gradient algorithm as known to persons skilled in the art, which not be detailed herein for understanding example embodiments of the present disclosure. However, example embodiments of the present disclosure further provide for updating the parameters after each s-th proximal gradient iteration for the (s+1)-th iteration by the following proximal operator:

$$W_{s+1} = \underset{W}{\operatorname{argmin}} \frac{1}{2} \|W - G(\tilde{W}_s)\|_2^2 + \lambda \sum_{i,j: i \neq j} \|w_{ij}\|_2$$

Herein, $\tilde{W}_s$ is the search point for the s-th iteration of proximal gradient. As known to persons skilled in the art, each iteration of gradient algorithms searches for a converging minimal value of the optimization function by starting at a search point. To assist in speeding up convergence, Nesterov's accelerated gradient ("NAG"), as expressed in the below equation, may be utilized to update each $\tilde{W}_s$ at an accelerated rate by determining it from a combination of the previous two points with a combination scalar $\alpha_s \in [0,1]$:

$$\tilde{W}_s = W_s + \alpha_s(W_s - W_{s-1})$$

Furthermore, $$G(\tilde{W}_s) = \tilde{W}_s - \frac{1}{\gamma_s}(\nabla f_1(\tilde{W}_s) + \nabla f_2(\tilde{W}_s))$$

is the gradient step of the s-th iteration of proximal gradient; $\gamma_s$ is the step size; and $\nabla f_1(\tilde{W}_s)$ and $\nabla f_2(\tilde{W}_s)$ are respective gradients of $f_1(\bullet)$ and $f_2(\bullet)$ at the search point $\tilde{W}_s$.

The gradients may be derived as follows by taking partial derivatives of the functions at the search point:

$$\frac{\partial f_1(W)}{\partial W^{(l)}} = \sum_{t=L+1}^{T} x[t-l] \left( \sum_{l=1}^{L} W^{(\tau)} x[t-\tau] - x[t] \right)^T$$

$$\nabla f_1(W) = \left\{ \frac{\partial f_1(W)}{\partial W^{(1)}}, \frac{\partial f_1(W)}{\partial W^{(2)}}, \dots, \frac{\partial f_1(W)}{\partial W^{(L)}} \right\}$$

$$\frac{\partial f_2(W)}{\partial W^{(l)}} = (\beta \|w_{ij}\|_2^2 - a_{ij}^k - v_{ij}^k) \cdot 2\beta \rho_1 w_{ij}$$

$$\nabla f_2(W) = \left\{ \frac{\partial f_1(W)}{\partial w_{ij}} \mid i, j: i \neq j \right\}$$

Furthermore, $W_{s+1}$ may be solved by the following:

$$\hat{w}_{ij} = \begin{cases} \left(1 - \frac{\lambda}{\|G(\hat{W}_s)_{ij}\|_2}\right) G(\hat{W}_s)_{ij}, & \text{if } \lambda > 0, \|G(\hat{W}_s)_{ij}\|_2 > \lambda \\ 0, & \text{if } \lambda > 0, \|G(\hat{W}_s)_{ij}\|_2 \leq \lambda \\ G(\hat{W}_s)_{ij}, & \text{if } \lambda = 0 \text{ or } i = j \end{cases}$$

Wherein $G(\tilde{W}_s)_{ij} = [G(\tilde{W}_s)_{ij}^{(1)}, G(\tilde{W}_s)_{ij}^{(2)}, \dots, G(\tilde{W}_s)_{ij}^{(L)}] \in \mathbb{R}^{1 \times L}$.

Each iteration k+1 solving for $A^{k+1}$ (which follows the iteration k+1 solving for $W^{k+1}$) may solve the following optimization function holding the parameters $W^{k+1}$, $V^k$, and $b^k$ from the previous iteration constant:

$$a_{ij}^{k+1} = \begin{cases} \underset{A \in \mathbb{R}_{\geq 0}^{N \times N}}{\operatorname{argmin}} f_3(A) + f_4(A) & \text{if } i \neq j \\ 0 & \text{if } i = j \end{cases}$$

$$f_3(A) \doteq \frac{\rho_1}{2} \sum_{i,j: i \neq j} (a_{ij} - \beta \|w_{ij}^{k+1}\|_2^2 + v_{ij}^k)^2$$

$$f_4(A) \doteq \frac{\rho_2}{2} (\operatorname{trace}(e^A) - N + b^k)^2$$

Herein, the optimization function may only guarantee the acyclicity constraint of $\operatorname{trace}(e^A) = N$ as long as $b^k = 0$ and $\rho_2 \to +\infty$. Thus, over each s-th iteration up to an arbitrarily set quasi-Newton iteration maximum (number of iterations of quasi-Newton $\rho_2$ searching; by way of example, the maximum may be set to 100), $\rho_2$ may be gradually increased up to an upper bound (by way of example, the upper bound may be 1e20). Specifics of increasing $\rho_2$ are further detailed below with reference to FIG. 2.

The gradients may be derived as follows by taking partial derivatives of the functions at the search point:

$$\frac{\partial f_3(A)}{\partial a_{ij}} = \rho_1 (a_{ij}^k - \beta \|w_{ij}^{k+1}\|_2^2 + v_{ij}^k)$$

$$\nabla f_3(A) = \left\{ \frac{\partial f_3(A)}{\partial a_{ij}} \mid i, j: i \neq j \right\}$$

$$\nabla f_4(A) = \rho_2 (\operatorname{trace}(e^A) - N + b^k) e^A$$

This optimization function may be solved by a quasi-Newton algorithm as known to persons skilled in the art to directly determine a local minimum of $f_3(A) + f_4(A)$, which not be detailed herein for understanding example embodiments of the present disclosure. In particular, according to example embodiments of the present disclosure, the quasi-Newton algorithm may be a limited-memory Broyden-Fletcher-Goldfarb-Shanno ("L-BFGS") algorithm which may approximate the output of the non-limited BFGS algorithm in determining a local minimum. Furthermore, the L-BFGS algorithm may be subject to bound constraints ("L-BFGS-B algorithm"). Example embodiments of the present disclosure further provide for updating the parameters after each s-th L-BFGS-B iteration for the (s+1)-th iteration.

To set $\lambda_{<0>}$ as described above to force all off-diagonal coefficients to zero values, in terms of the proximal descent algorithm as described above, $\lambda_{<0>}$ may be set to force all $w_{ij}$ to 0 for $i \neq j$, as follows:

$$\lambda_{<0>} \doteq \max_{i,j: i \neq j} \|G(0)_{ij}\|_2 = \max_{i,j: i \neq j} \|\nabla f_1(0) + \nabla f_2(0)\|_2$$

In the notations $G(0)$, $f_1(0)$, and $f_2(0)$, "0" should be read as a zero matrix of appropriate size rather than the number 0.

Subsequently each regularization term $\lambda_{<p>}$ for each p-th training phase 1, 2, ..., may be updated by $\lambda_{<p>} = \eta \lambda_{<p-1>}$, with a selected $0 < \eta < 1$, so as to gradually decrease the regularization term.

FIG. 2 illustrates a method 200 of optimizing a sparse VAR model operating under DAG structural constraints according to example embodiments of the present disclosure.

At a step 202, a VAR model according to example embodiments of the present disclosure receives as input a multivariate time series X or multiple univariate time series (also represented herein as X for simplicity); a first penalty parameter $\rho_1$; and a regularization parameter $\lambda$. The VAR model may, for example, be a sVAR-DAG model as described herein.

At a step 204, the VAR model initializes, for a ADMM iteration counter k starting at 1, a tensor $\mathcal{W}^k$ as a zero tensor; an adjacency matrix $A^k$ as a zero matrix; a first scaled dual variable $V^k$ as a zero matrix; and a second scaled dual variable $b^k$ as a zero value.

The subsequent steps 206 to 216 may be looped until the VAR model reaches convergence, such that $\hat{\mathcal{W}} = \mathcal{W}^k$ (a tensor output by the previous iteration of the VAR model converges with a tensor output by the current iteration), and $\hat{A} = A^k$ (an adjacency matrix output by the previous iteration of the VAR model converges with an adjacency matrix output by the current iteration). Upon such convergence, the VAR model may output $\hat{\mathcal{W}}$ and $\hat{A}$.

At a step 206, the VAR model computes a tensor $\mathcal{W}^{k+1}$ by solving a first optimization function by a gradient algorithm. Details of this computation are described above with reference to a proximal gradient algorithm and shall not be reiterated herein.

At a step 208, the VAR model initializes a second penalty parameter $\rho_2$ at an initial value (such as, by way of example, 1); and a copy of the adjacency matrix $A_{(s)}$ at a value of $A^k$.

The subsequent steps 210 to 212 may be looped to gradually increase $\rho_2$ to preserve the DAG structure, under some constraints, i.e., the predefined upper bound of $\rho_2$, and the predefined maximum number of iteration described above, or the loop is terminated as described below.

At a step 210, the VAR model computes the copy of the adjacency matrix $A_{(s+1)}$ by solving a second optimization function by a quasi-Newton algorithm, with reference to $\rho_2$ and $A_{(s)}$. Details of this computation are described above with reference to a L-BFGS-B algorithm and shall not be reiterated herein.

At a step 212, the VAR model increases the second penalty parameter for a next quasi-Newton iteration while an acyclicity constraint is maintained. The VAR model may determine that the acyclicity constraint is maintained by checking that $|\text{trace}(e^{A_{(s+1)}}) - N| > \sigma |\text{trace}(e^{A_{(s)}}) - N|$, wherein $\sigma$ is an arbitrarily or experimentally set tuning parameter (set to 0.25 herein, by way of example). If this statement remains true, then the VAR model increases $\rho_2$ (by way of example, $\rho_2$ may be multiplied by an arbitrarily or experimentally set tuning parameter $\delta$, set to 10 herein by way of example). The VAR model also increments the quasi-Newton iteration counter by 1. If this statement is no longer true, then the VAR model terminates the quasi-Newton loop.

At a step 214, the VAR model updates the adjacency matrix $A^k$ to $A^{k+1}$ for a next ADMM iteration using the computed copy of the adjacency matrix $A_{(s+1)}$.

At a step 216, the VAR model updates the first scaled dual variable, the second scaled dual variable, and the ADMM iteration counter. This may be performed as follows:

$$v_{ij}^{k+1} = v_{ij}^k + a_{ij}^{k+1} - \beta \|w_{ij}^{k+1}\|_2^2, i \neq j$$

$$b^{k+1} = b^k + \text{trace}(e^{A^{k+1}}) - N$$

$$k = k + 1$$

At a step 218, the VAR model outputs $\hat{\mathcal{W}}$ and $\hat{A}$ representing an inferred causal network, as described above upon convergence of the model.

Example embodiments of the present disclosure may be implemented on server hosts and computing hosts. Server hosts may be any suitable networked server, such as cloud computing systems, which may provide collections of servers hosting computing resources such as a database containing multivariate time series data or multiple univariate time series data. Computing hosts such as data centers may host VAR models according to example embodiments of the present disclosure to provide functions in accordance to optimize a VAR model subject to sparsity constraints and acyclicity constraints.

A cloud computing system may connect to various end devices which users may operate to collect data, organize data, set parameters, and run the VAR model to perform optimization. End devices may connect to the server hosts through one or more networks, such as edge nodes of the cloud computing system. An edge node may be any server providing an outbound connection from connections to other nodes of the cloud computing system, and thus may demarcate a logical edge, and not necessarily a physical edge, of a network of the cloud computing system. Moreover, an edge node may be edge-based logical nodes that deploy non-centralized computing resources of the cloud computing system, such as cloudlets, fog nodes, and the like.

Figure 3A:
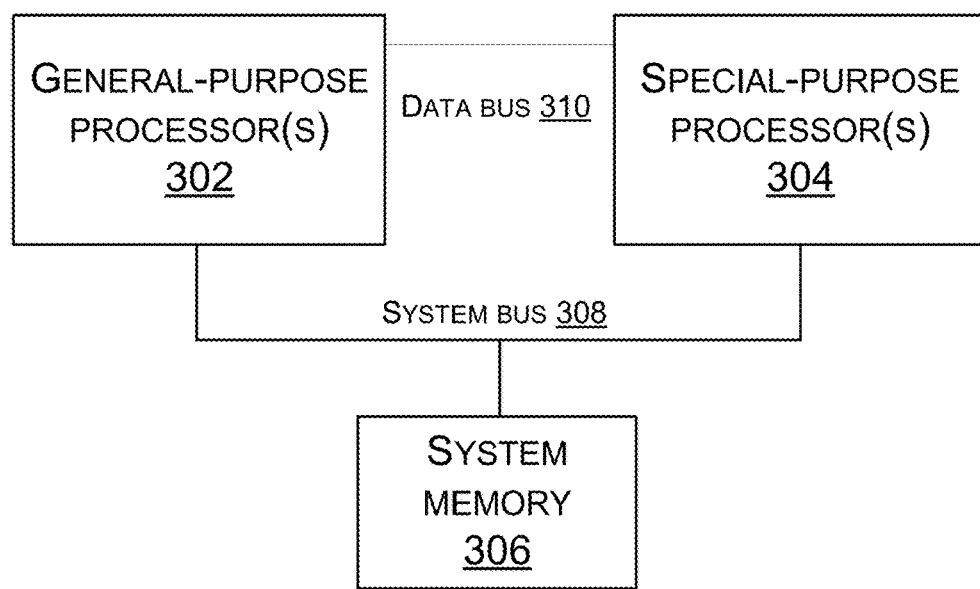
FIGS. 3A and 3B illustrate a system architecture of a system configured to compute source separation according to example embodiments of the present disclosure.
Figure 3B:
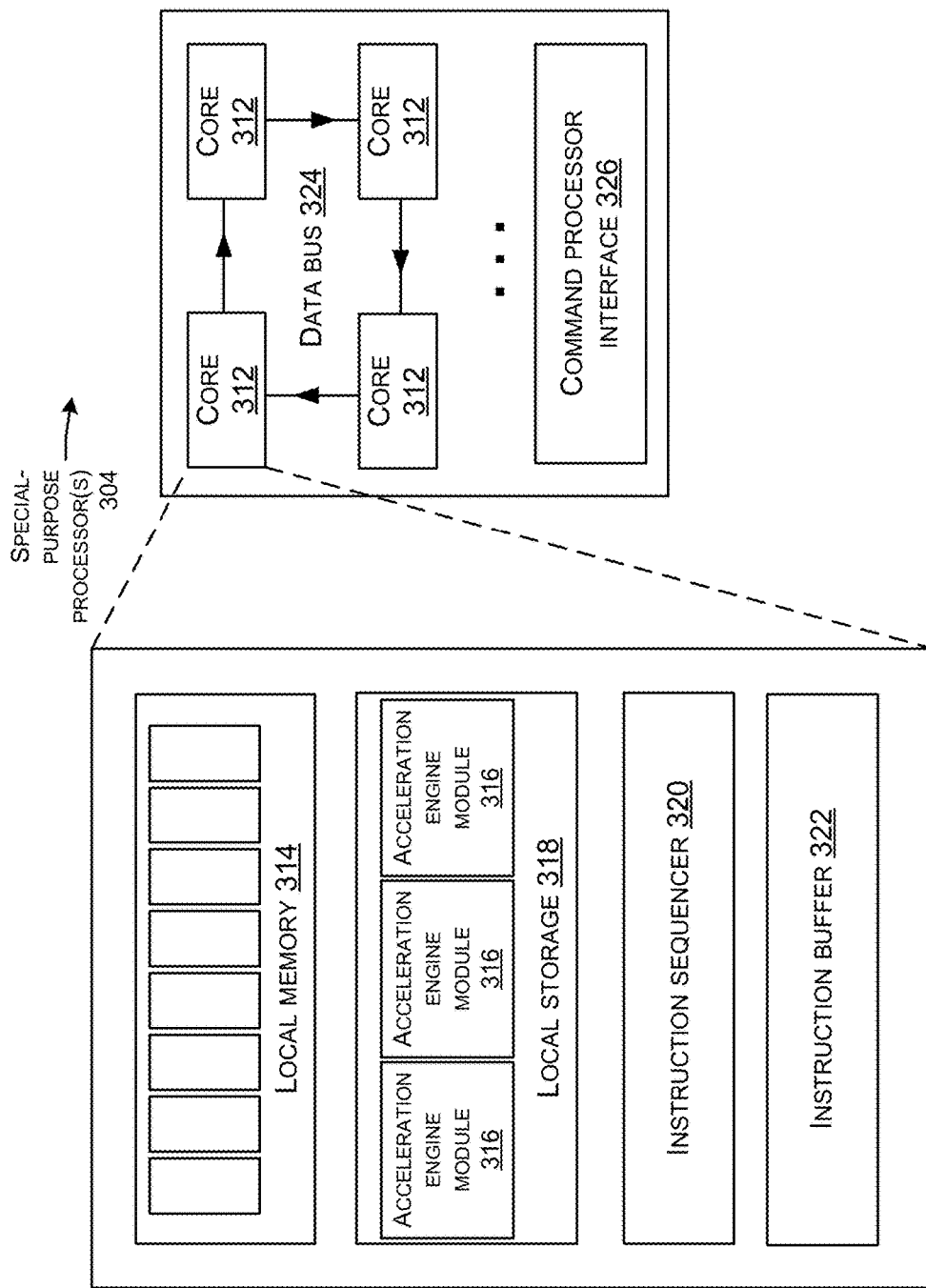

FIGS. 3A and 3B illustrate a system architecture of a system 300 configured to compute VAR model optimization according to example embodiments of the present disclosure.

A system 300 according to example embodiments of the present disclosure may include one or more general-purpose processor(s) 302 and one or more special-purpose processor(s) 304. The general-purpose processor(s) 302 and special-purpose processor(s) 304 may be physical or may be virtualized and/or distributed. The general-purpose processor(s) 302 and special-purpose processor(s) 304 may execute one or more instructions stored on a computer-readable storage medium as described below to cause the general-purpose processor(s) 302 or special-purpose processor(s) 304 to perform a variety of functions. Special-purpose processor(s) 304 may be computing devices having hardware or software elements facilitating computation of neural network computing tasks such as training and inference computations. For example, special-purpose processor(s) 304 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate computation of tasks such as training and inference, special-purpose processor(s) 304 may, for example, implement engines operative to compute mathematical operations such as matrix operations and vector operations.

A system 300 may further include a system memory 306 communicatively coupled to the general-purpose processor(s) 302 and the special-purpose processor(s) 304 by a system bus 308. The system memory 306 may be physical or may be virtualized and/or distributed. Depending on the exact configuration and type of the system 300, the system memory 306 may be volatile, such as RAM, non-volatile, such as ROM, flash memory, miniature hard drive, memory card, and the like, or some combination thereof.

The system bus 308 may transport data between the general-purpose processor(s) 302 and the system memory 306, between the special-purpose processor(s) 304 and the system memory 306, and between the general-purpose processor(s) 302 and the special-purpose processor(s) 304. Furthermore, a data bus 310 may transport data between the general-purpose processor(s) 302 and the special-purpose processor(s) 304. The data bus 310 may, for example, be a Peripheral Component Interconnect Express ("PCIe") connection, a Coherent Accelerator Processor Interface ("CAPI") connection, and the like.

FIG. 3B illustrates an example of special-purpose processor(s) 304, including any number of core(s) 312. Processing power of the special-purpose processor(s) 304 may be distributed among the core(s) 312. Each core 312 may include local memory 314, which may contain pre-initialized data, such as model parameters, or data structures, such as constant buffers for batch normalization or quantization, for the performance of special-purpose computing. Each core 312 may further be configured to execute one or more sets of computer-executable acceleration engine modules 316 pre-initialized on local storage 318 of the core 312, which may each be executable by the core(s) 312, including execution in parallel by multiple core(s) 312, to perform or accelerate, for example, arithmetic operations such as matrix multiplication or matrix transposition, function operations, or specially defined operations such as evaluating an exponent of a matrix, gradient algorithm optimization or quasi-Newton algorithm optimization as defined herein. Each core 312 may further include an instruction sequencer 320, which receives and orders instructions received from an instruction buffer 322. Some number of core(s) 312, such as four, may be in communication by a data bus 324, such as a unidirectional ring bus. Software drivers controlling operation of each core 312 may control the core(s) 312 and synchronize their operations by sending executable commands through a command processor interface 326.

Multivariate data series or multiple univariate data series may be transported to special-purpose processor(s) 304 over a system bus 308 or a data bus 310, where VAR model optimization may be performed by the special-purpose processor(s) 304 on the multivariate data series or multiple univariate data series as described herein, and output tensors, adjacency matrices, and graphs as described herein.

Thus, example embodiments of the present disclosure provide optimizing a vector autoregressive model conforming to structural constraints of sparsity and acyclicity, so that the model, during fitting to multivariate data series or multiple univariate data series, will tend to match expected observations regarding sparsity of causal relationship networks without overfitting, and will conform to acyclicity requirements for Bayesian statistical distributions, without a need to prune the causal inference network subsequently.

Causal inference networks output by models according to example embodiments of the present disclosure may be applied to practical problems such as root cause analysis ("RCA") in a variety of fields, such as AIOps, information gathering and automation capabilities for the IT industry; causal impact analysis, which may be used to create actionable plans for business strategy; Bayesian inference, which may be utilized to create probability models; and the like.

Figure 4:
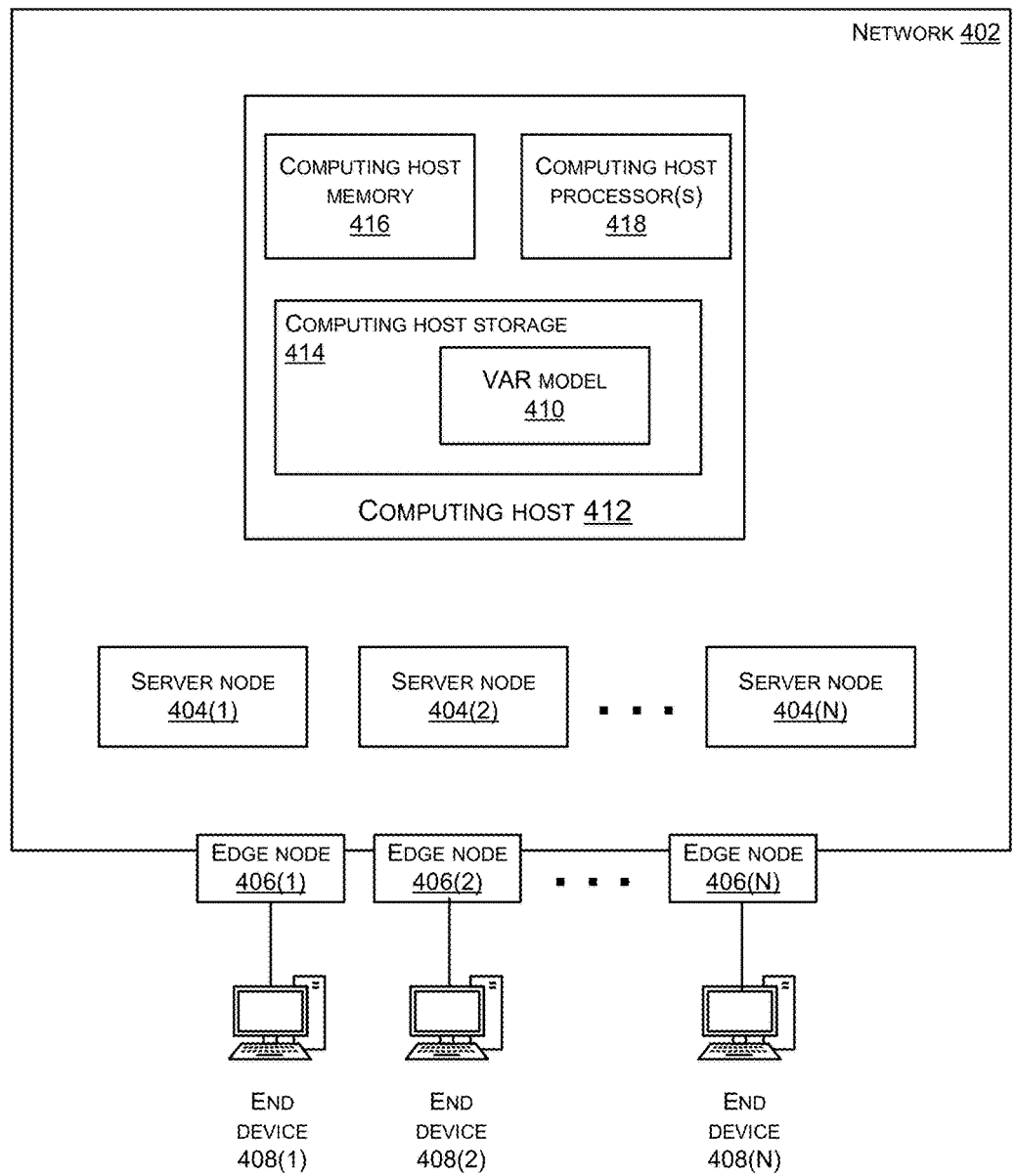
FIG. 4 illustrates an architectural diagram of server host(s) and a remote computing host for computing resources and a learning model according to example embodiments of the present disclosure.

FIG. 4 illustrates an architectural diagram of server host(s) 400 and a computing host for computing resources and a VAR model according to example embodiments of the present disclosure. As described above, according to example embodiments of the present disclosure, a cloud computing system may be operative to provide server host functionality for hosting computing resources, supported by a computing host such as a data center hosting a VAR model. Thus, this figure illustrates some possible architectural embodiments of computing devices as described above.

The server host(s) 400 may be implemented over a network 402 of physical or virtual server nodes 404(1), 404(2), ..., 404(N) (where any unspecified server node may be referred to as a server node 404) connected by physical or virtual network connections. Furthermore, the network 402 terminates at physical or virtual edge nodes 406(1), 406(2), ..., 406(N) (where any unspecified edge node may be referred to as an edge node 406) located at physical and/or logical edges of the network 402. The edge nodes 406(1) to 406(N) may connect to any number of end devices 408(1), 408(2), ..., 408(N) (where any unspecified end device may be referred to as an end device 408).

A VAR model 410 implemented on a computing host accessed through an interface of the server host(s) 400 as described in example embodiments of the present disclosure may be stored on physical or virtual storage of a computing host 412 ("computing host storage 414"), and may be loaded into physical or virtual memory of the computing host 412 ("computing host memory 416") in order for one or more physical or virtual processor(s) of the computing host 412 ("computing host processor(s) 418") to perform computations using the VAR model 410 to compute time series data related to optimization as described herein. Computing host processor(s) 418 may be special-purpose computing devices facilitating computation of matrix arithmetic computing tasks. For example, computing host processor(s) 418 may be one or more special-purpose processor(s) 304 as described above, including accelerator(s) such as Neural Network Processing Units ("NPUs"), Graphics Processing Units ("GPUs"), Tensor Processing Units ("TPU"), and the like.

According to example embodiments of the present disclosure, different modules of a VAR model as described below with reference to FIG. 5 may be executed by different processors of the computing host processor(s) 418 or may execute by a same processor of the computing host processor(s) 418 on different cores or different threads, and each module may perform computation concurrently relative to each other submodule.

Figure 5:
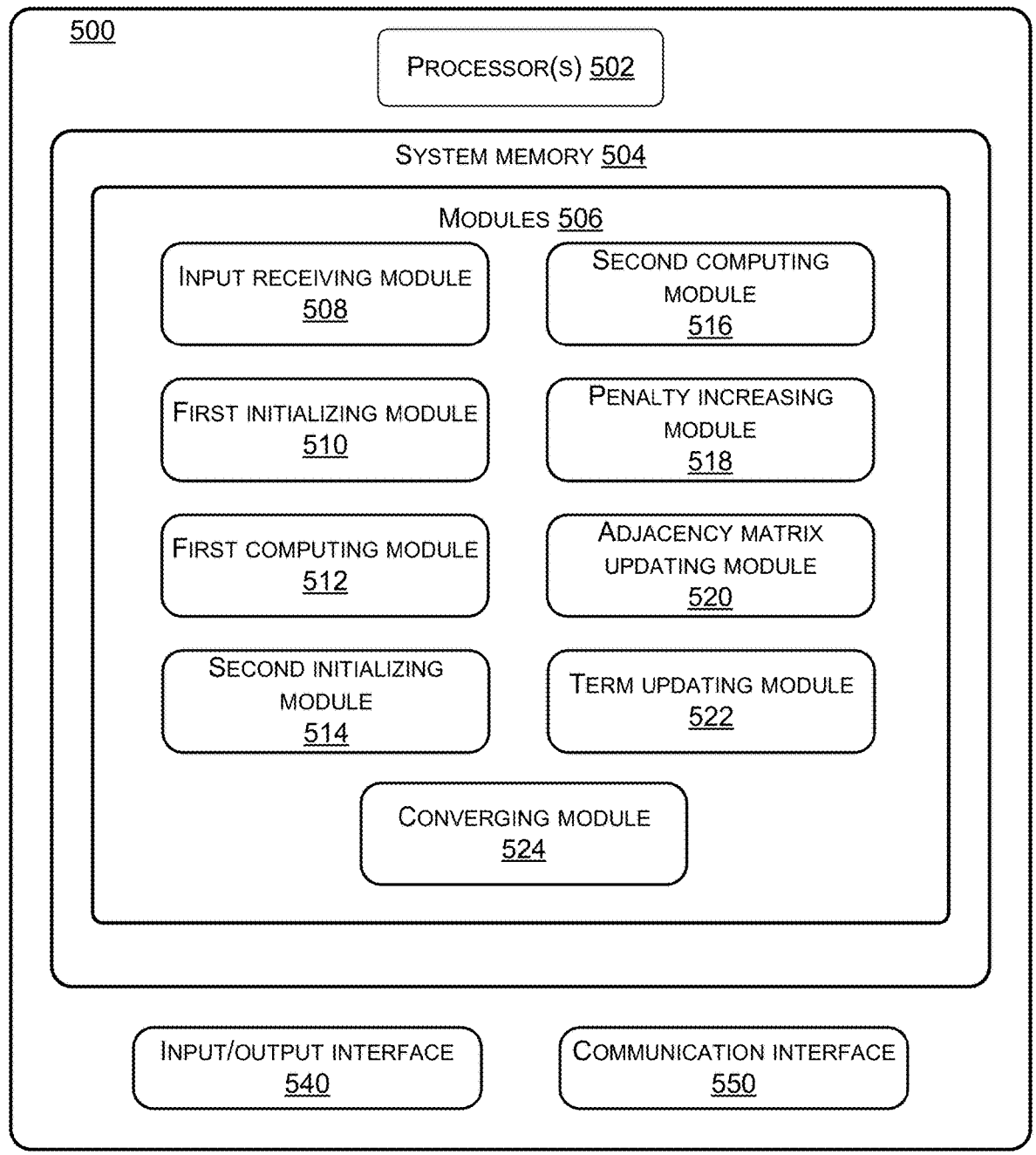
FIG. 5 illustrates an example computing system for implementing the processes and methods described above for implementing a vector autoregressive model.

FIG. 5 illustrates an example computing system 500 for implementing the processes and methods described above for implementing a vector autoregressive model.

The techniques and mechanisms described herein may be implemented by multiple instances of the computing system 500, as well as by any other computing device, system, and/or environment. The computing system 500, as described above, may be any varieties of computing devices, such as personal computers, personal tablets, mobile devices, other such computing devices operative to perform matrix arithmetic computations. The system 500 shown in FIG. 5 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 500 may include one or more processors 502 and system memory 504 communicatively coupled to the processor(s) 502. The processor(s) 502 and system memory 504 may be physical or may be virtualized and/or distributed. The processor(s) 502 may execute one or more modules and/or processes to cause the processor(s) 502 to perform a variety of functions. In embodiments, the processor(s) 502 may include a central processing unit ("CPU"), a GPU, an NPU, a TPU, any combinations thereof, or other processing units or components known in the art. Additionally, each of the processor(s) 502 may possess its own local memory, which also may store program modules, program data, and/or one or more operating systems.

Depending on the exact configuration and type of the system 500, the system memory 504 may be volatile, such as RAM, non-volatile, such as ROM, flash memory, miniature hard drive, memory card, and the like, or some combination thereof. The system memory 504 may include one or more computer-executable modules 506 that are executable by the processor(s) 502. The modules 506 may be hosted on a network as services for a data processing platform, which may be implemented on a separate system from the system 500.

The modules 506 may include, but are not limited to, an input receiving module 508, a first initializing module 510, a first computing module 512, a second initializing module 514, a second computing module 516, a penalty increasing module 518, an adjacency matrix updating module 520, a term updating module 522, and a converging module 524.

The input receiving module 508 may be configured to receive inputs to a VAR model as described above with reference to step 202.

The first initializing module 510 may be configured to initialize parameters of gradient computations as described above with reference to step 204.

The first computing module 512 may be configured to compute a tensor by solving a first optimization function by a gradient descent algorithm as described above with reference to step 206.

The second initializing module 514 may be configured to initialize parameters of quasi-Newton computations as described above with reference to step 208.

The second computing module 516 may be configured to compute an adjacency matrix by solving a second optimization function by a quasi-Newton algorithm as described above with reference to step 210.

The penalty increasing module 518 may be configured to increase the second penalty parameter for a next quasi-Newton iteration while the acyclicity constraint is maintained as described above with reference to step 212.

The adjacency matrix updating module 520 may be configured to update an adjacency matrix for a next gradient iteration using a computed copy of the adjacency matrix as described above with reference to step 214.

The term updating module 522 may be configured to update terms for a next gradient iteration other than an adjacency matrix as described above with reference to step 216.

The converging module 524 may be configured to output a tensor and an adjacency matrix representing an inferred causal network upon convergence of the model as described above with reference to step 218.

The system 500 may additionally include an input/output ("I/O") interface 540 and a communication module 550 allowing the system 500 to communicate with other systems and devices over a network, such as server host(s) as described above. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RANI"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides optimizing a vector autoregressive model conforming to structural constraints of sparsity and acyclicity. A regularization term is introduced to the model to impose the sparsity structural constraint such that most off-diagonal coefficients of an autoregressive coefficient matrix are forced to zero values. One or more penalty terms are introduced to the model to impose the acyclicity structural constraint such that coefficients of the main diagonal are not causally self-related. The resulting model is then reformulated for computation as an augmented Lagrangian function, and further computed for different parameters in alternating iterations to make the computations tractable and within magnitude and precision limits of digital computers. Models of the present disclosure provide improved computing performance over existing models by directly inferring a sparse causal network having a directed acyclic graph structure without a separate pruning step.

EXAMPLE CLAUSES

A. A method comprising: optimizing, based on multiple variables of at least one time series and a regularization term, a first function iteratively by a first optimization algorithm; optimizing, based on the multiple variables and at least one penalty parameter, a second function iteratively by a second optimization algorithm in alternation with optimizing the first function; and outputting an adjacency matrix representing and inferred causal network of the multiple variables, the causal network having structural sparsity and structural acyclicity.

B. The method as paragraph A recites, wherein the regularization term influences off-diagonal coefficients of the adjacency matrix representing the inferred causal network.

C. The method as paragraph A recites, wherein the at least one penalty parameter limits a trace of an exponential of the adjacency matrix representing the inferred causal network.

D. The method as paragraph A recites, wherein the first optimization algorithm comprises a gradient algorithm.

E. The method as paragraph A recites, wherein the second optimization algorithm comprises a quasi-Newton algorithm.

F. The method as paragraph A recites, wherein the first function and the second function comprise augmented Lagrangian functions.

G. The method as paragraph F recites, wherein parameters of the augmented Lagrangian functions are updated after each respective iteration of optimizing the first function and optimizing the second function.

H. A system comprising: one or more processors; and memory communicatively coupled to the one or more processors, the memory storing computer-executable modules executable by the one or more processors that, when executed by the one or more processors, perform associated operations, the computer-executable modules comprising: a first computing module configured to optimize, based on multiple variables of at least one time series and a regularization term, a first function iteratively by a first optimization algorithm; a second computing module configured to optimize, based on the multiple variables and at least one penalty parameter, a second function iteratively by a second optimization algorithm in alternation with optimizing the first function; and a converging module configured to output an adjacency matrix representing an inferred causal network of the multiple variables, the causal network having structural sparsity and structural acyclicity.

I. The system as paragraph H recites, wherein the regularization term influences off-diagonal coefficients of the adjacency matrix representing the inferred causal network.

J. The system as paragraph H recites, wherein the at least one penalty parameter limits a trace of an exponential of the adjacency matrix representing the inferred causal network.

K. The system as paragraph H recites, wherein the first optimization algorithm comprises a gradient algorithm.

L. The system as paragraph H recites, wherein the second optimization algorithm comprises a quasi-Newton algorithm.

M. The system as paragraph H recites, wherein the first function and the second function comprise augmented Lagrangian functions.

N. The system as paragraph M recites, further comprising an adjacency matrix updating module and a penalty increasing module configured to update parameters of the augmented Lagrangian functions after each respective iteration of optimizing the first function and optimizing the second function.

O. A computer-readable storage medium storing computer-readable instructions executable by one or more processors, that when executed by the one or more processors, cause the one or more processors to perform operations comprising: computing co-attention for a search query and a context string; optimizing, based on multiple variables of at least one time series and a regularization term, a first function iteratively by a first optimization algorithm; optimizing, based on the multiple variables and at least one penalty parameter, a second function iteratively by a second optimization algorithm in alternation with optimizing the first function; and outputting an adjacency matrix representing and inferred causal network of the multiple variables, the causal network having structural sparsity and structural acyclicity.

P. The computer-readable storage medium as paragraph O recites, wherein the regularization term influences off-diagonal coefficients of the adjacency matrix representing the inferred causal network.

Q. The computer-readable storage medium as paragraph O recites, wherein the at least one penalty parameter limits a trace of an exponential of the adjacency matrix representing the inferred causal network.

R. The computer-readable storage medium as paragraph O recites, wherein the first optimization algorithm comprises a gradient algorithm.

S. The computer-readable storage medium as paragraph O recites, wherein the second optimization algorithm comprises a quasi-Newton algorithm.

T. The computer-readable storage medium as paragraph O recites, wherein the first function and the second function comprise augmented Lagrangian functions.

U. The computer-readable storage medium as paragraph T recites, wherein the operations further comprise updating parameters of the augmented Lagrangian functions after each respective iteration of optimizing the first function and optimizing the second function.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
  optimizing, based on multiple variables of at least one time series and a regularization term, a first function iteratively by a first optimization algorithm;
  optimizing, based on the multiple variables and at least one penalty parameter, a second function iteratively by a second optimization algorithm in alternation with optimizing the first function; and
  outputting an adjacency matrix representing an inferred causal network of the multiple variables, the causal network having structural sparsity and structural acyclicity;

wherein the regularization term influences off-diagonal coefficients of the adjacency matrix representing the inferred causal network.

2. The method of claim 1, wherein the at least one penalty parameter limits a trace of an exponential of the adjacency matrix representing the inferred causal network.

3. The method of claim 1, wherein the first optimization algorithm comprises a gradient algorithm.

4. The method of claim 1, wherein the second optimization algorithm comprises a quasi-Newton algorithm.

5. The method of claim 1, wherein the first function and the second function comprise augmented Lagrangian functions.

6. The method of claim 5, wherein parameters of the augmented Lagrangian functions are updated after each respective iteration of optimizing the first function and optimizing the second function.

7. A system comprising:
one or more processors; and
memory communicatively coupled to the one or more processors, the memory storing computer-executable modules executable by the one or more processors that, when executed by the one or more processors, perform associated operations, the computer-executable modules comprising:
a first computing module configured to optimize, based on multiple variables of at least one time series and a regularization term, a first function iteratively by a first optimization algorithm;
a second computing module configured to optimize, based on the multiple variables and at least one penalty parameter, a second function iteratively by a second optimization algorithm in alternation with optimizing the first function; and
a converging module configured to output an adjacency matrix representing an inferred causal network of the multiple variables, the causal network having structural sparsity and structural acyclicity;
wherein the regularization term influences off-diagonal coefficients of the adjacency matrix representing the inferred causal network.

8. The system of claim 7, wherein the at least one penalty parameter limits a trace of an exponential of the adjacency matrix representing the inferred causal network.

9. The system of claim 7, wherein the first optimization algorithm comprises a gradient algorithm.

10. The system of claim 7, wherein the second optimization algorithm comprises a quasi-Newton algorithm.

11. The system of claim 7, wherein the first function and the second function comprise augmented Lagrangian functions.

12. The system of claim 11, further comprising an adjacency matrix updating module and a penalty increasing module configured to update parameters of the augmented Lagrangian functions after each respective iteration of optimizing the first function and optimizing the second function.

13. A computer-readable storage medium storing computer-readable instructions executable by one or more processors, that when executed by the one or more processors, cause the one or more processors to perform operations comprising:
optimizing, based on multiple variables of at least one time series and a regularization term, a first function iteratively by a first optimization algorithm;
optimizing, based on the multiple variables and at least one penalty parameter, a second function iteratively by a second optimization algorithm in alternation with optimizing the first function; and
outputting an adjacency matrix representing an inferred causal network of the multiple variables, the causal network having structural sparsity and structural acyclicity;
wherein the regularization term influences off-diagonal coefficients of the adjacency matrix representing the inferred causal network.

14. The computer-readable storage medium of claim 13, wherein the at least one penalty parameter limits a trace of an exponential of the adjacency matrix representing the inferred causal network.

15. The computer-readable storage medium of claim 13, wherein the first optimization algorithm comprises a gradient algorithm.

16. The computer-readable storage medium of claim 13, wherein the second optimization algorithm comprises a quasi-Newton algorithm.

17. The computer-readable storage medium of claim 13, wherein the first function and the second function comprise augmented Lagrangian functions.

* * * * *